UNITED STATES PATENT OFFICE.

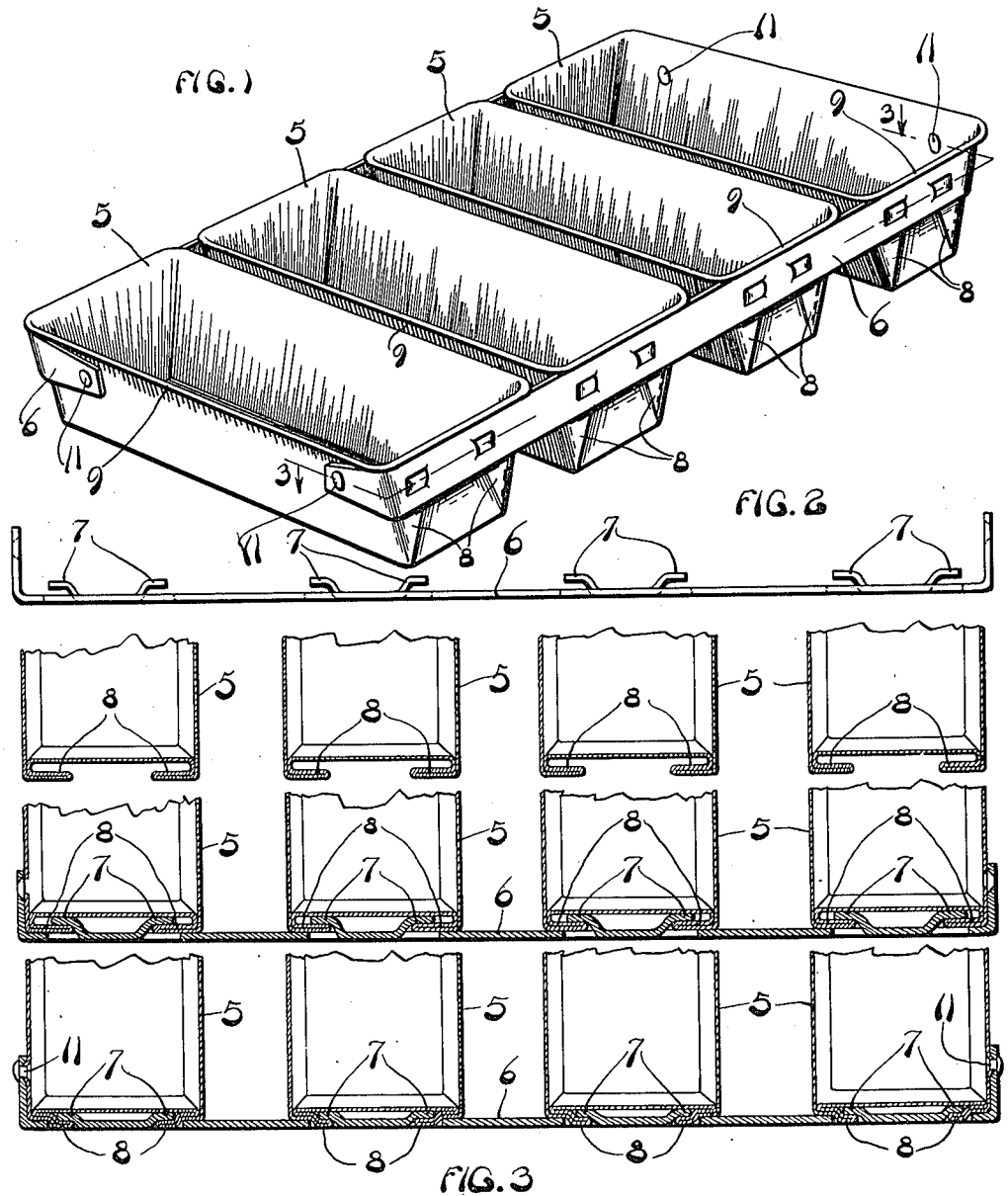

EDWIN F. LOCKWOOD AND HARRY A. LOCKWOOD, OF BELLEVUE, KENTUCKY.

BAKING-PAN.

1,206,872.  Specification of Letters Patent.  Patented Dec. 5, 1916.

Application filed June 28, 1912. Serial No. 706,321.

*To all whom it may concern:*

Be it known that we, EDWIN F. LOCKWOOD and HARRY A. LOCKWOOD, citizens of the United States of America, and residents of Bellevue, county of Campbell, and State of Kentucky, have invented certain new and useful Improvements in Baking-Pans, of which the following is a specification.

This invention relates to baking pans and has for an object to produce new and improved means for permanently securing a series of separate pans together, for the purpose of forming a frame of pans, of such size that it may be conveniently and economically handled. This and other objects we attain by means of apparatus embodying the features herein described and illustrated.

In the drawings accompanying and forming a part of this application, Figure 1 is a perspective view of a series of pans secured together in accordance with our invention. Fig. 2 is a plan view of a binding strip employed in securing the separate pans together. Fig. 3 illustrates three successive steps employed in the operation of securing the binding strips to the pans of the series for the purpose of connecting the pans together to form a permanent frame. Fragmental sectional views along the line 3—3 of Fig. 1 are employed for the purposes illustrated in Fig. 3.

It is desirable to bake bread in pans which are too small to be conveniently handled, and it is customary to permanently secure several such pans together into a frame for the purpose of simplifying the operation of handling them. The pans of the frame, must be separated from each other for the purpose of permitting an adequate circulation of air and also for the purpose of permitting each loaf to brown on all sides. It is necessary to provide rigid means for securing the pans together, so that the frame will not become bent or distorted either on account of the handling it receives or the differences of temperature to which it is subjected.

Our present invention contemplates securing a series of pans 5 together by means of strips 6, as illustrated in Fig. 1. The pans are located side by side, are spaced equal distances apart, and extend parallel to each other. The strips 6 extend across opposite ends of the pans, of the series, and each strip is permanently secured to each pan and is preferably turned at its ends so that it extends around the adjacent corner of each end pan and thereby forms a protection for two of the corners of the frame.

Each strip is provided with a plurality of pairs of pan-engaging lugs 7, which are located in alinement with each other and which are preferably stamped or cut from the metal of the strip. A pair of lugs 7 is provided on each strip, for engaging each pan of the series, and the lugs of each pair extend in opposite directions and are adapted to engage the end folds of the pans, as will hereinafter be described.

Each pan is preferably constructed in the ordinary manner from a single sheet of metal and is provided with the usual end folds or flaps 8, and is also provided with a rounded lip 9, which extends around its upper edge. The folds 8, however, are not pressed down against the end of the pan until after the strips 6 are in place. This construction is disclosed in the uppermost line of pans in Fig. 3, which illustrates the pans located in the relative positions they occupy when connected together to form a frame. The intermediate line of pans in Fig. 3 illustrates the strip 6 in place with its projecting lugs located under the edges of the folds. The edges of the folds, as is usual on pans so constructed, converge toward the top of the pan, and the lugs 7 of each pair are so spaced that their ends may be introduced under the edges of the oppositely disposed folds, near the bottom of the pan. After the lugs of one strip are inserted under the folds in this manner the strip is moved vertically along the pans to a position adjacent to the lips 9. With the strips in this position the converging folds 8 extend over the oppositely projecting lugs 7 of each pair, and the strips are then permanently locked in place by pressing them closer to the ends of the pans and by pressing the folds 8 against the ends of the pans. This bends the lugs 7 toward their mounting strips, so that they force portions of the metal of the folds into the recesses in the strip, from which the lugs are cut, and it also forces the metal of the folds into close engagement with each lug and prevents it from being moved relatively to its engaging pan. The strips are therefore permanently locked to the pans, during the operation of flattening the folds against the sides of the pans. This forms a simple method of securing the pans together, and also produces a rigid and strong frame of pans. The bent over ends of each strip may be, and preferably are, riveted to the adjacent end pans as shown at 11, in Figs. 1 and 3. This increases the durability and rigidity of the frame without materially increasing the cost of manufacture.

In accordance with the United States patent statutes we have illustrated and described what we now consider to be the preferred form of our invention, and we desire it to be understood that various changes, substitutions and modifications may be made in the device illustrated, and in the process of constructing the same, without departing from the spirit and scope of our invention as set forth by the appended claims.

What we claim is:—

1. In combination, a series of pans located side by side, each pan having end folds formed thereon and strips extending along the opposite ends of the pans of the series and having lugs projecting under the end-folds of the pans.

2. In combination, a series of baking pans having integrally formed end-folds, a strip for locking the pans of the series together and having a series of pairs of oppositely extending lugs formed thereon for engaging the end-folds of the pans.

3. A frame of baking pans comprising a series of pans having integrally formed end folds and located side by side, end strips having lugs stamped thereon and projecting beneath the end-folds of the pans, the end-folds being distorted to positively lock the lugs in place.

4. A series of pans located side by side, strips engaging the ends of the pans, and lugs formed on the strips, with portions of said pans pressed and distorted to lockingly engage the lugs.

5. The combination of a series of pans having integrally formed end folds, and a strip having locking lugs formed thereon adapted to coöperate with the end folds in locking the pans of the series together.

6. In combination, a series of baking pans, having integrally formed end folds, strips for locking the pans of the series together, each strip having a series of pairs of oppositely projecting lugs formed at intermediate points thereon and moved into interlocking engagement with the end folds of the pans.

7. The combination of a series of pans having integrally formed end folds and a strip having means formed thereon adapted to coöperate with the end folds in locking the pans of the series together.

EDWIN F. LOCKWOOD.
HARRY A. LOCKWOOD.

Witnesses:
W. THORNTON BOGERT,
VERA GOTT.